April 14, 1964   C. P. GOGGI   3,128,748
APPARATUS AND METHOD FOR RECOVERING ENGINE DRAINAGE
Filed Jan. 19, 1962   3 Sheets-Sheet 1
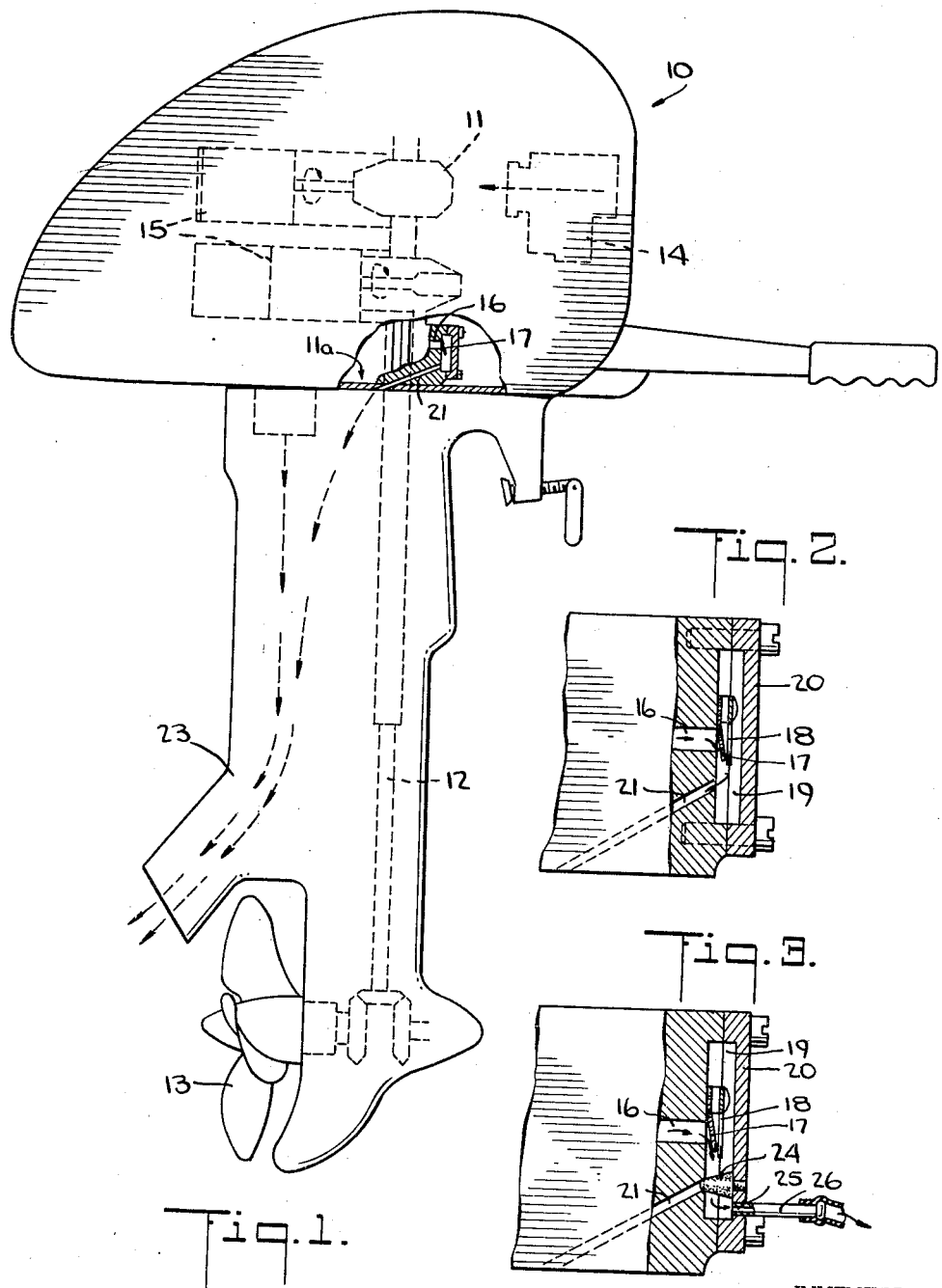
INVENTOR.
CHARLES P. GOGGI
BY
Kenyon & Kenyon
ATTORNEYS

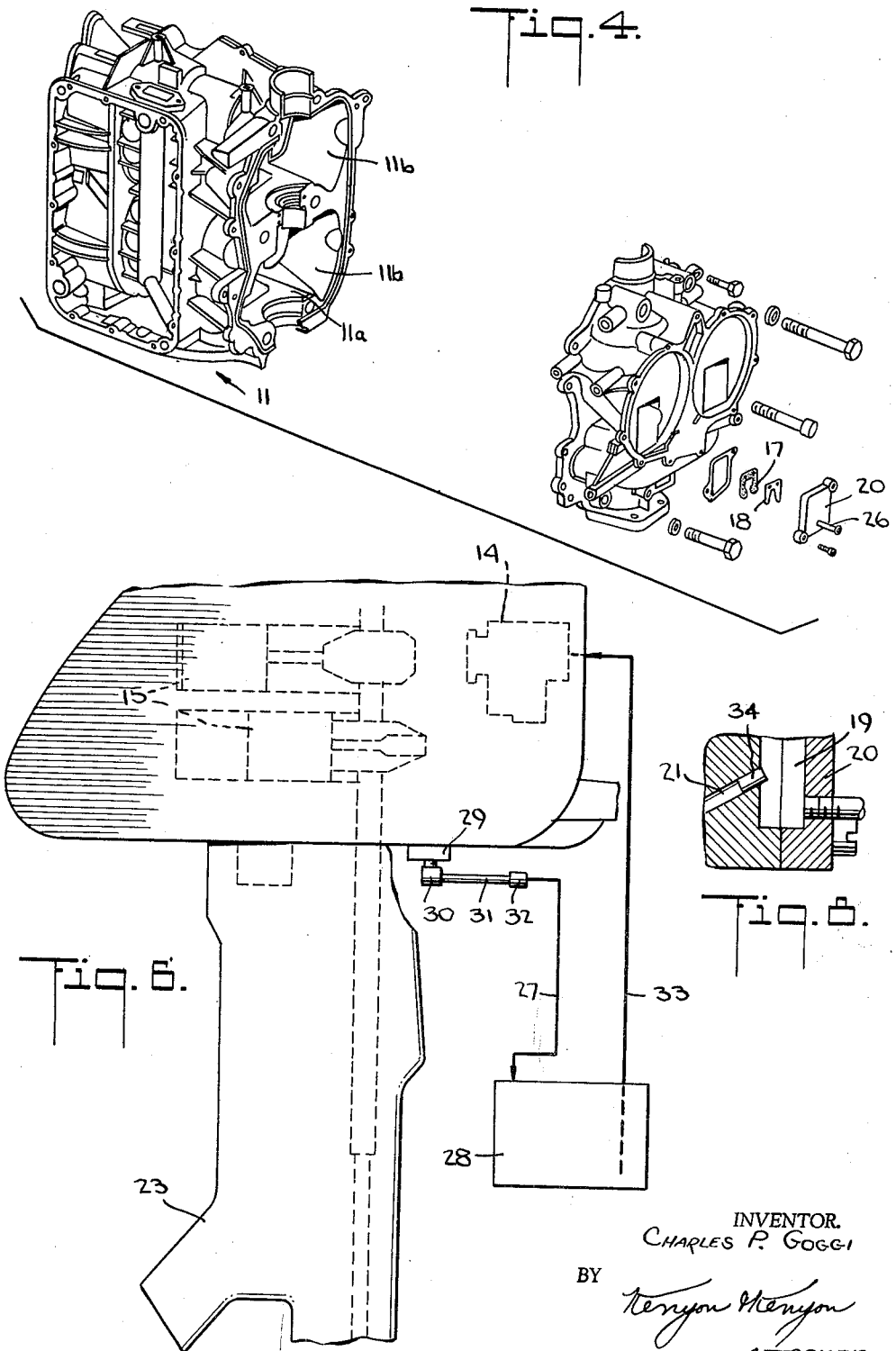

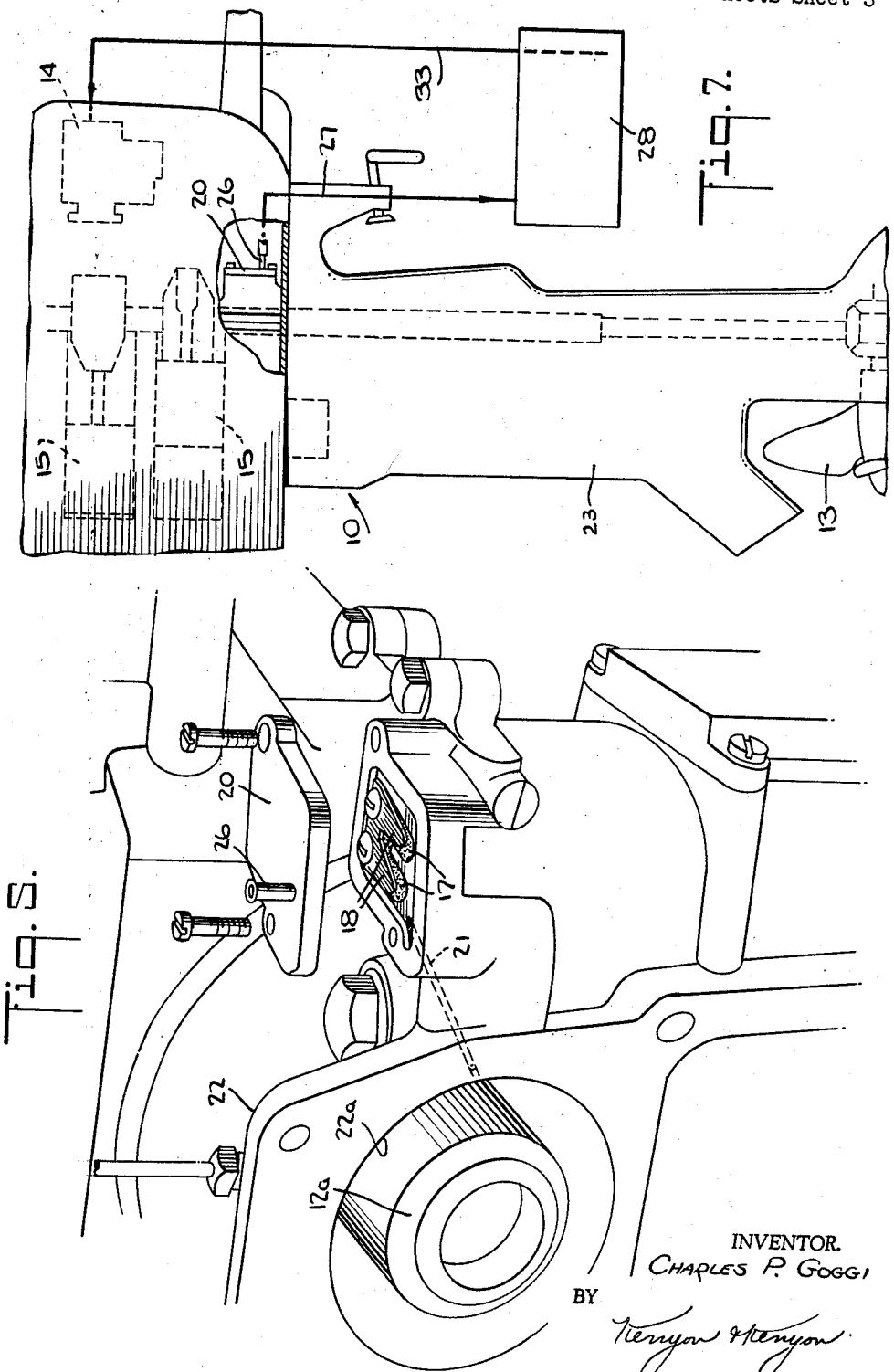

United States Patent Office 3,128,748
Patented Apr. 14, 1964

3,128,748
APPARATUS AND METHOD FOR RECOVERING ENGINE DRAINAGE
Charles P. Goggi, Staten Island, N.Y., assignor to Goggi Corporation, Staten Island, N.Y., a corporation of New York
Filed Jan. 19, 1962, Ser. No. 167,238
6 Claims. (Cl. 123—73)

This invention relates to internal combustion engines and more particularly to apparatus for recovering drainage from the engine during operation.

In certain internal combustion engines the crankcase forms a portion of the engine induction system. The more common case of this arrangement is found in the two-stroke cycle engine in which the fuel-air mixture from the carburetor passes through a valving arrangement into the crankcase and then through a port into the engine cylinder where combustion takes place. In such an engine pressure responsive valves such as reed valves are used to control the flow of the fuel-air mixture into the crankcase. Operation of the engine causes a fluctuating pressure within the crankcase which serves cylindrically to draw the charge of fuel and air past the reed valves. Within the crankcase, the charge is compressed sufficiently to enable it to pass into the cylinder. Thus the crankcase serves as the intermediate link between the valve arrangement and the cylinder which is to receive the fuel-air charge.

Normally when the engine is started the temperature of its various parts is that of the ambient temperature. At this temperature a portion of the fuel which has been vaporized at the carburetor, upon contact with the metal within the crankcase condenses into liquid along the walls of the crankcase. Since this reduces the fuel-air ratio of the mixture delivered to the cylinder it is customary to operate the carburetor choke in order to enrich the mixture during starting. Unsuccessful attempts to start the engine under such conditions results in an accumulation of liquid from the fuel-air mixture within the crankcase.

Since two-stroke cycle engines in which the crankcase forms a portion of the induction system normally are lubricated by oil mixed with the fuel, the liqud which condenses and accumulates within the crankcase consists of a mixture of fuel and oil. After the engine is started and is brought up to normal operating conditions the carburetor choke is deactivated and the normal fuel-air mixture as determined by the carburetor is delivered to the engine. During normal operation, however, it is still possible for a certain accumulation of liquid within the crankcase due to imperfect vaporization of the fuel at the carburetor and the fact that portions of the crankcase may remain at a temperature low enough to condense a portion of the fuel and oil in the mixture. If during starting or running of the engine a sufficient quantity of liquid is allowed to accumulate within the crankcase, it is possible for the liquid to be forced into the cylinder during the intake portion of the stroke. If sufficient liquid entered the cylinder and was trapped therein the piston upon returning toward the direction of the cylinder head would force the liquid against the head and a "hydraulic lock" condition could result. In the hydraulic lock condition the incompressible liquid is trapped in the clearance space between the piston and the cylinder head so that no further motion of the piston can occur without setting up destructive loads upon the various engine parts.

To prevent the accumulation of liquid in two-stroke cycle engines, drains have been provided to enable the liquid within the crankcase to be removed. Valves responsive to the pressure in the crankcase have been employed which open under positive pressure and permit the accumulated liquid to be forced from the interior portion of the crankcase. The fluid released by the valve device is disposed of by dumping it into the exhaust passages of the engine.

Marine engines of the outboard motor type are commonly two-stroke cycle engines. In outboard motors the fuel and oil drained from the crankcase by a valving arrangement is normally released into the exhaust system which discharges beneath the surface of the water in which the motor operates. Consequently when the motor is started a certain quantity of fuel and oil is discharged into the water adjacent to the motor and an oil film is then observed adjacent to the boat. Valving arrangements which respond to the fluctuating pressure in the crankcase to release the accumulated liquids continue to discharge liquid during operation whenever it accumulates in the crankcase. After the liquid has been discharged the pressure responsive valves continue to release a steady flow of the fuel-air mixture since it is always present under fluctuating pressure within the crankcase whenever the engine is operating. Thus during normal operation the steady flow of unburned fuel containing lubricating oil is discharged from the exhaust passages of the engine into the adjacent water.

With the tremendous increase in the popularity of outboard motor boating it is quite evident that the fuel and oil drained from the crankcase presents a source of contamination for lakes, ponds, and rivers upon which the boats operate. If the body of water is one of a limited size such as a small lake, pond, or artificial body of water, it is evident that a sufficiently high level of boating activity can in time result in severe contamination of the water.

The contamination caused by the draining of fuel and oil from the crankcase is accentuated wherever outboard motors are operated in very small bodies. However, even in large lakes and rivers any discharge of fuel and oil in the vicinity of people swimming is undesirable and beyond being distasteful can actually present a fire hazard.

In addition to causing the contamination problem the drainage of fuel and oil from the engine into the water is a waste of a certain portion of the fuel and oil which could otherwise be consumed by the engine. With the rapid trend to large outboard motors up to the size of 100 H.P. it is evident that the loss of fuel and oil not only during starting but in the form of vapor during continuous operation can be economically significant.

The principal object of the invention is to recover the fuel and oil drained from the induction system of an internal combustion engine.

Another object of this invention is to recover fuel and oil drained from the induction system of an internal combustion engine so that it can be returned to the engine fuel supply.

Still another object of this invention is to convert an engine having overboard drainage provisions to a system in which the drainage can be recovered.

Further objects will be apparent from the following description and claims and the accompanying drawings wherein:

FIG. 1 is a schematic representation of an outboard motor having a drainage system discharging the drainage into the exhaust of the motor;

FIG. 2 is an enlarged schematic representation of the passages employed in the motor of FIG. 1 to direct the drainage into the exhaust of the motor;

FIG. 3 is a schematic representation of the provisions of the invention for modifying the motor of FIG. 1 so that the drainage can be accumulated;

FIG. 4 is a perspective view of a typical outboard motor crankcase and related portions showing the provisions of the invention for the accumulation of the drainage;

FIG. 5 is an enlarged fragmentary perspective view of a typical outboard motor showing the drainage valve arrangement in accordance with the provisions of the invention;

FIG. 6 is a schematic representation of an outboard motor which normally discharges the drainage directly into the exhaust modified in accordance with the provisions of the invention;

FIG. 7 is a schematic representation of an outboard motor showing the accumulated drainage being returned to the engine fuel tank;

FIG. 8 is a schematic representation showing the conventional drainage passage containing a plug in accordance with the invention.

Briefly the present invention comprises a device for venting fluid from the crankcase of an engine in which the crankcase forms a portion of the fuel-air induction system. A container or tank is connected to the venting device so that the fluid delivered by the venting device can be recovered.

In one embodiment of the invention a valve responsive to the fluctuating pressure within the crankcase vents the liquid therefrom to a container connected to the venting device.

In another embodiment of the invention a passage extending from the interior to the exterior of the crankcase is provided with a pressure responsive valve for venting the fluid in the crankcase in response to the pressure fluctuations therein. A container connected to the valve device accumulates the fluid.

In still another embodiment of the invention the drainage valve of the crankcase delivers the fluid adjacent to a passage which would otherwise lead to the exhaust section of the engine. In accordance with the invention the passage is closed and an additional passage is provided which is connected to a container adapted to receive the drainage fluid.

Referring now to the drawings, FIG. 1 shows a two-stroke cycle outboard motor 10 comprising crankcase 11 from which extends drive shaft 12. The lower end of the drive shaft is connected by gearing to propeller 13. Carburetor 14 delivers a fuel-air mixture to crankcase 11. In the conventional manner the fuel passing through carburetor 14 contains a predetermined fraction of lubricating oil which serves to lubricate the pistons and anti-friction bearings within the motor.

In motor 10 cylinder 15 is conventionally disposed in a substantially horizontal direction. For the case of a multi-cylinder engine the cylinders are located one above the other. Liquid present within the crankcase can descend to lower portion 11a where it can accumulate. Drainage passage 16 extends from the interior of crankcase 11 adjacent lower portion 11a to the outside. In the case of a multi-cylinder motor additional drainage passages may be provided which lead to the other cylinders. In some motors a plurality of passages extending into lower portion 11a may be employed to increase the flow area.

As shown in FIGS. 2 and 5 leaf valves 17 having stops 18 are disposed over the exterior openings of drainage passages 16. Pressure fluctuations within cavities 11b of crankcase 11 (FIG. 4) operate leaf valves 17. The openings of drainage passages 16 and leaf valves 17 are disposed within chamber 19 which is provided with cover 20. Within the chamber there is provided discharge passage 21 which conventionally leads to the interior portion 22a of adapter 22. From within interior portion 22a the drainage fuel and oil can pass downwardly into exhaust tube 23 of the motor.

As shown in FIG. 3 in accordance with the provisions of the invention cover 20 is provided with plug 24 which is adapted to seal the entrance to discharge passage 21.

Plug 24 may be fabricated from plastic material, oil resistant rubber, or the like. In addition cover 20 is provided with recovery passage 25 from which extends at the outer portion of cover 20, fitting 26. The cover of the invention can be obtained by reworking an existing part or by fabricating a new one.

In order to accumulate the drainage fuel and oil, line 27 is connected between fitting 26 and fuel tank 28 or any other suitable container. During operation with this arrangement the fluctuating pressure within crankcase 11 causes leaf valves 17 to operate in a cyclic manner. Stops 18 limit the outward movement of the leaf valves. The passage of fluid through the drainage passage 16 entrains any liquid in lower portion 11a of the crankcase and forces it outwardly toward chamber 19. With cover 20 in place plug 24 closes the opening of discharge passage 21 so that the drainage passes through recovery passage 25 and then onto line 27 leading to the fuel tank. Within tank 28 the drainage liquid mixes with the normal supply of fuel which is fed by means of line 29 to carburetor 14. After the quantity of liquid within lower portion 11a of the crankcase has been discharged to fuel tank 28, a mixture of fuel vapor and air continues to pass through the system into tank 28. Thus during normal continuous operation the fuel vapor and oil vapor which would otherwise be lost is recovered by the system. Instead of employing plug 24 attached to cover 20, plug 34 can be inserted into drainage passage 21 (FIG. 8).

In FIG. 5 there is shown a schematic representation of an outboard motor in which the accumulated liquid is conventionally passed internally within the crankcase by means of check valve or constriction 29 directly to exhaust tube 23. With this internal arrangement in accordance with the invention adapter 30 having recovery passage 31 is connected to check valve or constriction 29 in order that the drainage flow may be brought to the exterior portion of the motor. Fitting 32 connects recovery tubes 31 to line 27 which routes the recovered liquid or vaporized fuel and oil to tank 28.

In the case of certain existing motors, it has been speculated that the drainage liquid is employed to lubricate certain parts exposed to the drainage delivered from discharge passage 21 such as drive shaft coupling 12a. Experience in operating motors including the provisions of the present invention shows that the existence of any substantial lubricating function is doubtful and that in any event it is non-essential since motor operation without difficulty or abnormal wear can be obtained whenever the drainage is accumulated in accordance with the invention.

It is to be understood that the apparatus of the invention for accumulating drainage from the crankcase can be applied to an existing motor or can be applied initially upon the manufacture of a new motor. It is to be further understood that the accumulated liquids or condensed fuel and oil vapors can be directed to the engine fuel tank or to separate containers for the storage of the recovered product. It is also to be understood that in the case of existing motors the system can be applied to motors having drainage arrangements which are adjacent to the exterior portion of the motor as well as drainage arrangements which are entirely within the interior of the motor. Furthermore the system for accumulating and recovering the drainage from the induction system is adapted to engines other than those designed for marine applications, such as the engines of garden tractors, power tools, power mowers, and the like.

While the invention has been described in some particularity it is to be understood that certain changes in the arrangement and fabrication of parts can be employed without departing from the spirit and scope of the invention as set forth in the appended claims.

I claim:

1. In an engine having an induction system adapted to convey the fuel-air mixture to the engine cylinder, said induction system having a passage extending from the interior portion thereof to the exhaust system of said engine, said passage being adapted to convey drainage fluid from said induction system to said exhaust system, the combination comprising means for closing said passage to said exhaust system and means connected to said passage for accumulating said drainage fluid from said induction system.

2. A device for recovering drainage fluid from the induction system of an engine having an open chamber, a drainage passage extending from said induction system to said chamber and a discharge passage extending from said chamber to the exhaust system of said engine, said device comprising a cover adapted to close said chamber, said cover containing a recovery passage extending through said cover and adapted for connection to a container, and means extending from said cover being adapted to close said discharge passage from said exhaust system, whereby drainage fluid is diverted from said discharge passage to said recovery passage.

3. A device for recovering drainage fluid from the induction system of an engine having an open chamber, a drainage passage extending from said induction system to said chamber, and a passage extending from said chamber to the exhaust system of said engine, said device comprising a cover adapted to close said chamber, said cover containing a recovery passage adapted for connection to a container, and a plug member extending from said cover being adapted to close said discharge passage from said exhaust system, whereby drainage fluid is diverted from said discharge passage to said recovery passage.

4. A device for recovering drainage fluid from the induction system of an engine in accordance with claim 3 in which said plug member is of resilient material.

5. In an engine having a fuel tank for providing fuel to a carburetor and an induction system adapted to convey the fuel-air mixture from said carburetor to the engine cylinder, said induction system having a passage extending from the interior portion thereof, to the exhaust system of said engine, said passage being adapted to convey drainage fluid from said induction system to said exhaust system, the combination comprising means for closing said passage to said exhaust system and means connected to said passage for delivering said drainage fluid from said induction system to said fuel tank.

6. In an engine having an induction system adapted to convey the fuel-air mixture to the engine cylinder, said induction system having a passage extending from the interior portion thereof to the exhaust system of said engine, said passage being adapted to convey drainage fluid from said induction system to said exhaust system, the combination comprising means for closing said passage to said exhaust system and means connected to said passage for delivering said drainage fluid therefrom.

References Cited in the file of this patent

UNITED STATES PATENTS

| | | |
|---|---|---|
| 2,682,259 | Watkins | June 29, 1954 |
| 2,717,584 | Upton | Sept. 13, 1955 |